US011536514B2

United States Patent
Taguchi et al.

(10) Patent No.: US 11,536,514 B2
(45) Date of Patent: Dec. 27, 2022

(54) ELECTRIC FURNACE AND METHOD FOR MELTING AND REDUCING IRON OXIDE-CONTAINING IRON RAW MATERIAL

(71) Applicant: NIPPON STEEL CORPORATION, Tokyo (JP)

(72) Inventors: Takahiro Taguchi, Tokyo (JP); Tsuyoshi Yamazaki, Tokyo (JP); Shuhei Kasahara, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 364 days.

(21) Appl. No.: 16/757,276

(22) PCT Filed: Oct. 17, 2018

(86) PCT No.: PCT/JP2018/038636
§ 371 (c)(1),
(2) Date: Apr. 17, 2020

(87) PCT Pub. No.: WO2019/082762
PCT Pub. Date: May 2, 2019

(65) Prior Publication Data
US 2021/0190427 A1    Jun. 24, 2021

(30) Foreign Application Priority Data

Oct. 23, 2017    (JP) .............................. JP2017-204540

(51) Int. Cl.
*F27B 3/08* (2006.01)
*F27B 3/22* (2006.01)
(Continued)

(52) U.S. Cl.
CPC .............. *F27B 3/085* (2013.01); *C21B 11/10* (2013.01); *F27B 3/22* (2013.01); *F27D 11/10* (2013.01);
(Continued)

(58) Field of Classification Search
CPC . C21B 11/10; C21C 5/52; F27B 3/085; F27B 3/18; F27B 3/22; F27D 11/08;
(Continued)

(56) References Cited

U.S. PATENT DOCUMENTS 3,861,660 A * 1/1975 Ammann ................ C22B 15/00
75/708
4,036,636 A * 7/1977 Ammann ................ C22B 23/02
75/643
(Continued)

FOREIGN PATENT DOCUMENTS

CN    101029794 A    9/2007
EP    0077 190 A2    4/1983
(Continued)

OTHER PUBLICATIONS

International Search Report for PCT/JP2018/038636 (PCT/ISA/210) dated Dec. 11, 2018.
(Continued)

*Primary Examiner* — Scott R Kastler
*Assistant Examiner* — Michael Aboagye
(74) *Attorney, Agent, or Firm* — Birch, Stewart, Kolasch & Birch, LLP (57) ABSTRACT

This electric furnace includes one or more upper electrodes, one or more bottom-blowing tuyeres, a mechanical stirrer equipped with an impeller, and a charging device which injects an iron oxide-containing iron raw material.

4 Claims, 5 Drawing Sheets

(51) Int. Cl.
   *F27D 11/10*    (2006.01)
   *F27D 27/00*    (2010.01)
   *C21B 11/10*    (2006.01)
   *F27B 3/18*     (2006.01)
   *F27D 3/00*     (2006.01)

(52) U.S. Cl.
   CPC ............... *F27D 27/00* (2013.01); *F27B 3/18* (2013.01); *F27D 3/0033* (2013.01)

(58) Field of Classification Search
   CPC .... F27D 11/10; F27D 2027/002; F27D 27/00; F27D 3/0033; F27D 3/16
   USPC ............. 75/10.63, 10.16, 583, 708, 10.46; 266/47, 168, 265, 176, 128
   See application file for complete search history.

(56) References Cited

U.S. PATENT DOCUMENTS

| | | | | |
|---|---|---|---|---|
| 4,071,687 | A | * | 1/1978 | Nakagawa ............... C21B 11/10 373/79 |
| 4,662,937 | A | * | 5/1987 | Katayama ............. C22C 33/003 420/72 |
| 4,913,732 | A | * | 4/1990 | Miyano ................. C21C 5/5264 75/10.46 |
| 5,518,523 | A | * | 5/1996 | Brotzmann ......... C21B 13/0013 75/502 |
| 6,149,709 | A | * | 11/2000 | Uragami ............. C21B 13/0046 75/10.63 |
| 2004/0060389 | A1 | | 4/2004 | Roth et al. |

FOREIGN PATENT DOCUMENTS

| | | |
|---|---|---|
| EP | 0 342 374 A | 11/1989 |
| EP | 1 253 207 A1 | 10/2002 |
| JP | 52-80216 A | 7/1977 |
| JP | 63-125611 A | 5/1988 |
| JP | 1-162713 A | 6/1989 |
| JP | 1-294815 A | 11/1989 |
| JP | 2000-45012 A | 2/2000 |
| JP | 2010-90428 A | 4/2010 |
| JP | 2011-84811 A | 4/2011 |
| JP | 2016-108575 A | 6/2016 |
| TW | 579391 B | 3/2004 |
| WO | WO 98/48060 A1 | 10/1998 |
| WO | WO 01/18256 A1 | 3/2001 |
| WO | WO 02/068700 A1 | 9/2002 |

OTHER PUBLICATIONS

Office Action issued in TW Application No. 107136766 dated Oct. 28, 2019.

Written Opinion of the International Searching Authority for PCT/JP2018/038636 (PCT/ISA/237) dated Dec. 11, 2018.

Chinese Office Action dated Apr. 2, 2021 for Chinese Patent Application No. 201880068529.3, with machine translation.

Lo Lip Ping et al., "Steelmaking Production", Metallurgical Industry Press, 1st Edition, Feb. 2016, pp. 56 and 83-84.

Xu Lijun et al., "Practical Engineering Technology for Arc Steelmaking Furnaces", Metallurgical Industry Press, 1st Edition, Feb. 2013, pp. 126 and 153.

* cited by examiner

ELECTRIC FURNACE AND METHOD FOR MELTING AND REDUCING IRON OXIDE-CONTAINING IRON RAW MATERIAL

TECHNICAL FIELD OF THE INVENTION

The present invention relates to an electric furnace for manufacturing hot metal using iron oxide-containing iron raw material, and a method for melting and reducing iron oxide-containing iron raw material using the electric furnace.

Priority is claimed on Japanese Patent Application No. 2017-204540 filed on Oct. 23, 2017, the content of which is incorporated herein by reference.

RELATED ART

In direct reduction ironmaking methods for manufacturing reduced iron from iron ore or dust generated from steel plants, regarding the type of a reducing furnace, a shaft furnace, a rotary kiln, a rotary hearth furnace, a fluidized bed, or the like is used, and, regarding a reducing agent, natural gas, coal, or the like is used. A variety of ironmaking processes using a combination of the reducing furnace and the reducing agent have been proposed and industrialized.

In addition, as a method for manufacturing hot metal using iron oxide-containing iron raw material manufactured by, among the direct reduction ironmaking methods, a method in which the type of the reducing furnace is a shaft furnace and natural gas is used as the reducing agent or a method in which the type of the reducing furnace is a rotary hearth furnace and coal is used as the reducing agent, a method in which iron oxide-containing iron raw material having a high reduction rate is melted in an arc furnace, thereby manufacturing hot metal has become the largest mainstream at the moment.

However, in order to manufacture the iron oxide-containing iron raw material having a high reduction rate, a large amount of a reducing agent is used, and a residence time taken for a reduction reaction of iron oxide to be almost completed becomes necessary, and thus it is difficult to employ the method in countries not producing natural gas from the viewpoint of costs and productivity. Therefore, instead of manufacturing the iron oxide-containing iron raw material having a high reduction rate in the direct reducing furnace, a method in which a direct reducing furnace is used as a preliminary reducing furnace, and iron oxide-containing iron raw material having a relatively low reduction rate manufactured by carrying out preliminary reduction in the preliminary reducing furnace is melted and reduced using an arc furnace or a melting converter, thereby manufacturing hot metal is being employed. On page 66 of Patent Document 1, it is described that a mixture raw material including half-reduced iron preliminarily reduced in a rotary hearth furnace (RHF) (pellet or powder-form mixture raw material) is charged into a submerged arc furnace (SRF), and finish refining intended for final reduction and melting is carried out. In SRF, oxygen gas and coal are supplied, and hot metal and recovery gas are obtained. In SRF, at the time of starting the furnace, it is necessary to charge hot heel such as hot metal; however, in a steady operation state, the presence of hot metal in the furnace eliminates the need therefor. Patent Document 2 discloses a method in which that lumps are produced by packing carbon material inside the dust generated in a conveter, heating the lumps at a high temperature in a preliminary reducing furnace to preliminarily reduce the carbon material packed in the dust as a reducing material, then supplied to a converter exclusively for melting in which hot heel is present as a part of an iron-containing cooling material in a high-temperature state, and reused.

In a method for manufacturing hot metal by charging iron oxide-containing iron raw material manufactured by preliminary reduction into an arc furnace in which hot heel is present and melting and reducing the iron oxide-containing iron raw material, the charged iron oxide-containing iron raw material is melted and reduced in a state of floating on the surface of the hot metal due to the small specific gravity as long as no attempt is made, for example, the hot metal is not stirred. In addition, the iron oxide-containing iron raw material contains slag components such as CaO or $SiO_2$, and thus, as the melting proceeds, slag floats on the surface of the hot metal, and the raw material charged from the top of the furnace is trapped by the slag and hindered from coming into contact with the hot metal, which prevents the melting of the iron oxide-containing iron raw material and decreases the yield of iron. In order to accelerate the melting and reduction of the charged iron oxide-containing iron raw material, a method for melting and reducing the raw material by engulfing the charged iron oxide-containing iron raw material into the hot metal by controlling the flow in association with using a possible high-temperature region is exemplified.

Regarding a method for melting and reducing an oxide raw material by charging the oxide raw material into a high-temperature region formed by an arc of a direct-current electric furnace or an alternating-current electric furnace and by carrying out bottom-blowing stirring, a variety of proposals have been made in the related art.

For example, Patent Document 3 describes an invention of a method for melting and reducing a metal oxide using a three-phase alternating-current electric furnace. The invention relates to a smelting reduction method by an electric furnace in which, in a three-phase alternating-current electric furnace, powdery ore of metal, for example, an ore of chromium is supplied to an arc region, the ore of chromium is melted by arc heat, furthermore, a gas-blowing nozzle is disposed in a furnace bottom of the electric furnace, and gas is blown to the molten metal in the electric furnace. However, the method is about the reduction of an ore of chromium, and it is difficult to separate a reduction reaction improvement effect by the contact between a reducing agent in slag and the ore and a reduction reaction improvement effect by the contact between the molten metal and the ore.

Patent Document 4 discloses a method in which, in an arc furnace for steelmaking, a carbon-containing fuel and an oxygen-containing gas are blown in, and oxygen is supplied from a nozzle disposed in a bottom of the arc furnace. The document describes that an arc furnace having three electrodes is used, ore, preliminarily-reduced ore, or the like are blown in through a hollow electrode, and bottom-blowing stirring is carried out when generating metallic melt. However, the document 4 does not describe the number density of the ore or the preliminarily-reduced ore in a high-temperature field formed by an arc, the disposition of a bottom-blowing nozzle in the bottom of the furnace, and the yield of the charged raw material.

PRIOR ART DOCUMENT

Patent Document

[Patent Document 1] PCT International Publication No. WO01/018256

[Patent Document 2] Japanese Unexamined Patent Application, First Publication No. 2000-45012

[Patent Document 3] Japanese Unexamined Patent Application, First Publication No. H1-294815

[Patent Document 4] Japanese Unexamined Patent Application, First Publication No. S63-125611

DISCLOSURE OF THE INVENTION

Problems to be Solved by the Invention

Regarding an electric furnace for manufacturing hot metal by charging iron oxide-containing iron raw material manufactured by preliminary reduction onto hot heel and melting and reducing the iron oxide-containing iron raw material, it is not possible to sufficiently mix the iron oxide-containing iron raw material with the hot metal by engulfing the iron oxide-containing iron raw material into the hot metal even when a method, which has been known in the related art, in which gas is blown into the hot metal from a furnace bottom in the electric furnace and the iron oxide-containing iron raw material is charged under stirring is employed. In addition, it is also not possible to keep the iron oxide-containing iron raw material having a small specific gravity in a high-temperature molten metal surface below an upper electrode, and an effect for improving the yield of iron is not sufficient.

An object of the present invention is to provide an electric furnace for melting and reducing iron oxide-containing iron raw material charged onto the hot metal of hot heel which has a high yield of iron and enables the melting and reduction of the iron oxide-containing iron raw material, and a method for melting and reducing iron oxide-containing iron raw material using the electric furnace.

Means for Solving the Problem

The core of the present invention is as described below.

(1) An electric furnace according to an aspect of the present invention includes one or more upper electrodes, one or more bottom-blowing tuyeres, a mechanical stirrer equipped with an impeller, and a charging device which injects an iron oxide-containing iron raw material.

(2) The electric furnace according to the above (1) may employ the following configuration. The electric furnace has: three or more of the bottom-blowing tuyeres; and a plurality of the upper electrodes, wherein, when a straight line orthogonal to a shortest line segment of individual line segments connecting centers of the upper electrodes and a center of the impeller is drawn at a point closer to the impeller between two points that equally divide the shortest line segment into three parts in a plan view, centers of at least three bottom-blowing tuyeres among the respective bottom-blowing tuyeres are present closer to the respective upper electrodes than the orthogonal straight line.

(3) In the electric furnace according to the above (2), in the plan view, centers of all of the respective upper electrodes and a raw material injection opening of the charging device may be present inside a polygonal shape connecting the respective centers of the three or more bottom-blowing tuyeres present closer to the respective upper electrodes than the orthogonal straight line.

(4) A method for melting and reducing an iron oxide-containing iron raw material according to an aspect of the present invention, in which the electric furnace according to any one of the above (1) to (3) is used. In this method for melting and reducing an iron oxide-containing iron raw material, when the iron oxide-containing iron raw material having an iron metallization percentage of 45% or more and 95% or less is charged from the charging device and melted and reduced in the electric furnace in which molten metal is present, slag present on a surface of the molten metal and the molten metal are stirred by immersing the impeller of the mechanical stirrer in the molten metal and rotating the impeller.

Effects of the Invention

According to the aspects of the present invention, in an electric furnace used to manufacture hot metal by supplying iron oxide-containing iron raw material onto hot metal and melting and reducing the iron oxide-containing iron raw material, both bottom-blowing stirring that accelerates the mixing of slag, the iron oxide-containing iron raw material, and the hot metal using gas blown from a bottom-blowing tuyere and mechanical stirring that engulfs the slag and the iron oxide-containing iron raw material floating on the hot metal by rotating the impeller into the hot metal are carried out, whereby it becomes possible to melt and reduce the iron oxide-containing iron raw material with a high yield of iron.

Furthermore, three or more bottom-blowing tuyeres are provided; in a plan view, an upper electrode and an injection opening of the iron oxide-containing iron raw material are disposed inside a polygonal shape connecting the centers of the respective bottom-blowing tuyeres; and the iron oxide-containing iron raw material is supplied to the inside of the polygonal shape. With this configuration, the iron oxide-containing iron raw material is charged into a high-temperature region immediately below the upper electrode, and it is possible to prevent the iron oxide-containing iron raw material from immediately moving toward a side wall. As a result, the melting and reduction of the iron oxide-containing iron raw material are accelerated. Furthermore, the slag moving from the high-temperature region and the iron oxide-containing iron raw material that has not been melted and reduced can be engulfed into the hot metal by rotating the impeller installed at a position apart from the high-temperature region immediately below the upper electrode, and thus the reduction of FeO in the slag or the melting and reduction of the iron oxide-containing iron raw material is further accelerated, and a high yield of iron can be stably attained.

EMBODIMENTS OF THE INVENTION

The subject of the present invention is an electric furnace capable of manufacturing hot metal by charging iron oxide-containing iron raw material onto hot metal of hot heel from the top of the furnace and melting and reducing the iron oxide-containing raw material by the contact between arc heat and the hot metal of the hot heel. In addition, the present invention provides an electric furnace in which: iron oxide-containing iron raw material charged from the top of the furnace resides in a high-temperature region formed by an arc generated from an upper electrode; a mechanical stirrer installed outside the high-temperature region is rotated to enable the engulfment of the iron oxide-containing iron raw material and slag having the high concentration of FeO, which is generated in association with the melting of the iron oxide-containing iron raw material, into hot metal; and hot metal can be manufactured with a high yield of iron.

The present invention is preferably applied to a direct-current arc furnace as an arc furnace. The present invention is also applicable to an alternating-current arc furnace. Regarding an embodiment of the present invention, hereinafter, a direct-current arc furnace will be described in detail as an example using FIG. 1 to FIG. 3.

Figure 1:
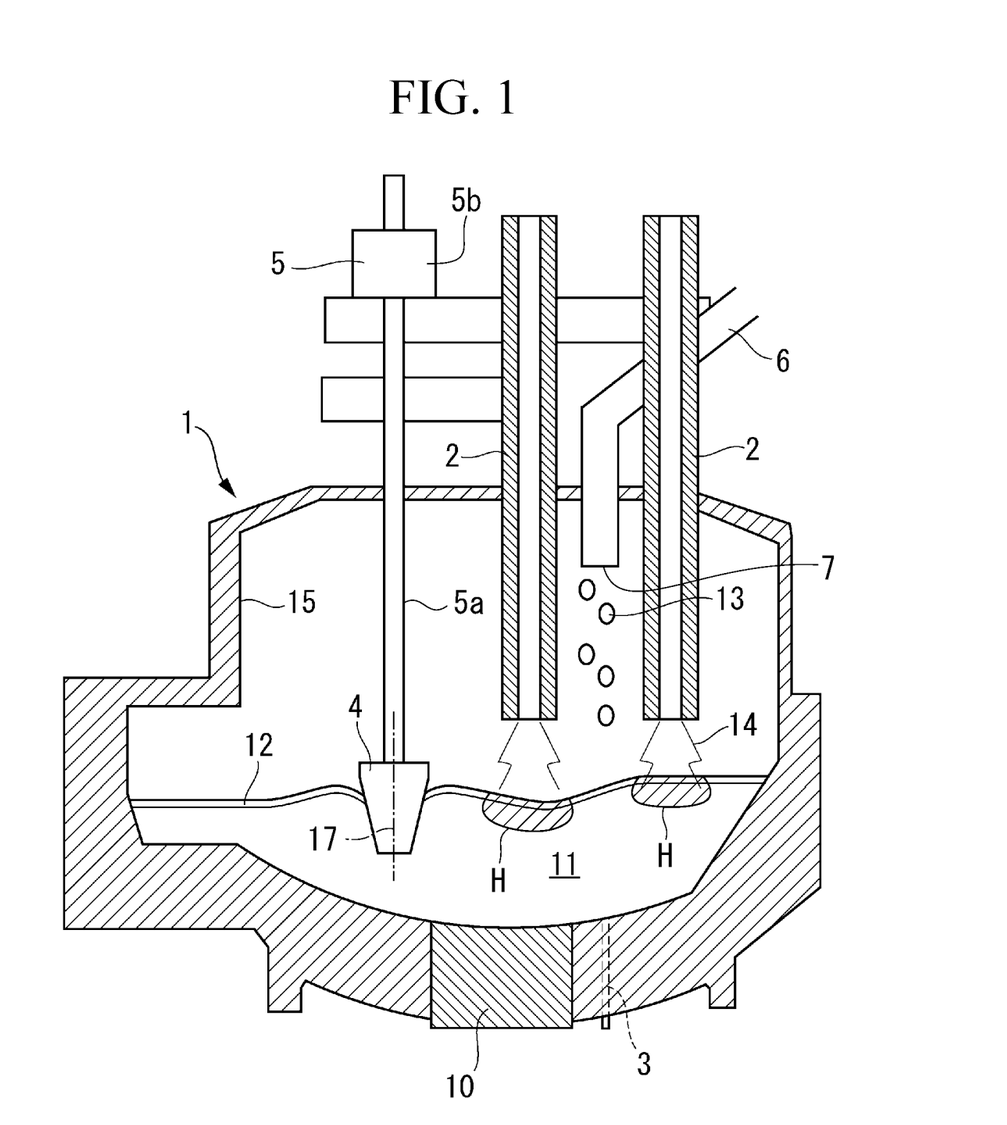
FIG. 1 is a vertical cross-sectional view showing an example of an electric furnace of the present invention.
Figure 2A:
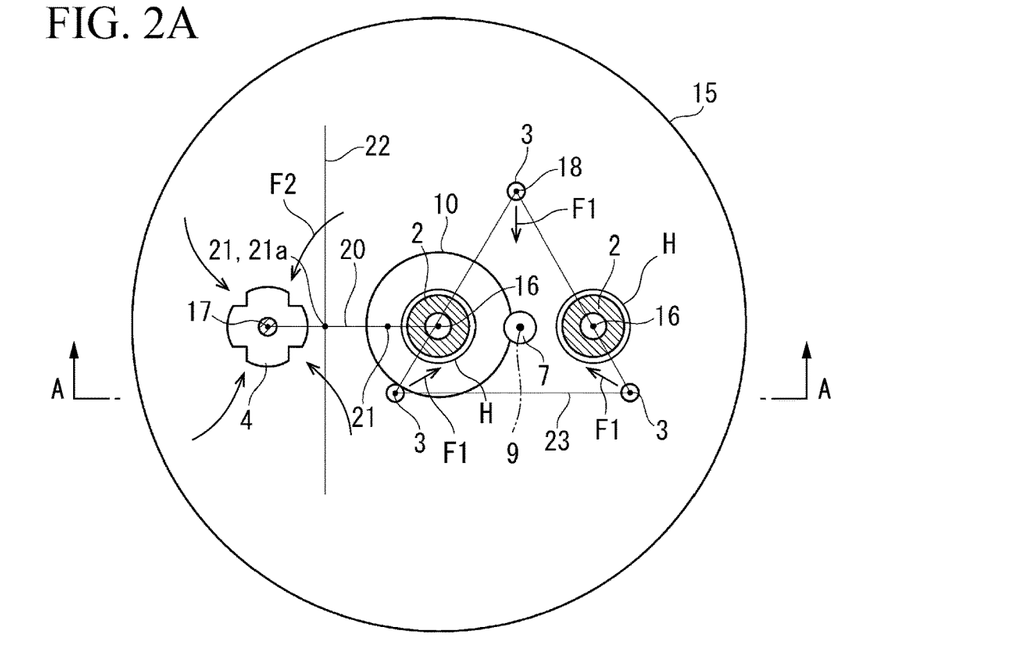
FIG. 2A is a planar cross-sectional view of the same electric furnace.
Figure 2B:
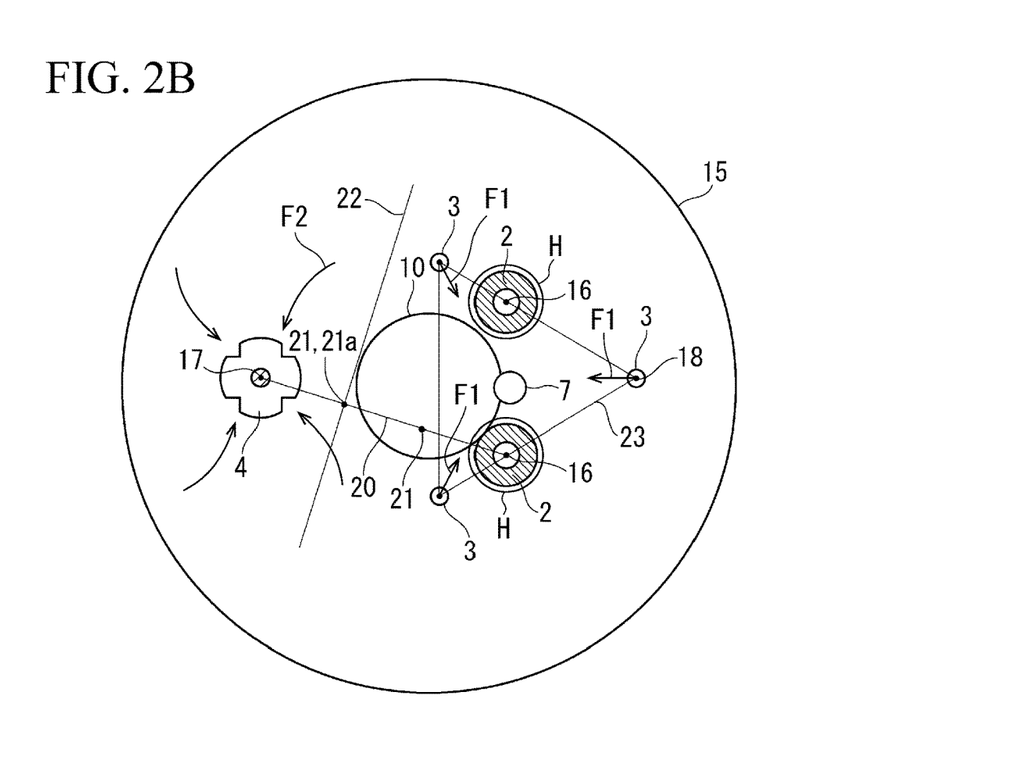
FIG. 2B is a planar cross-sectional view showing another example of the electric furnace of the present invention.
Figure 3:
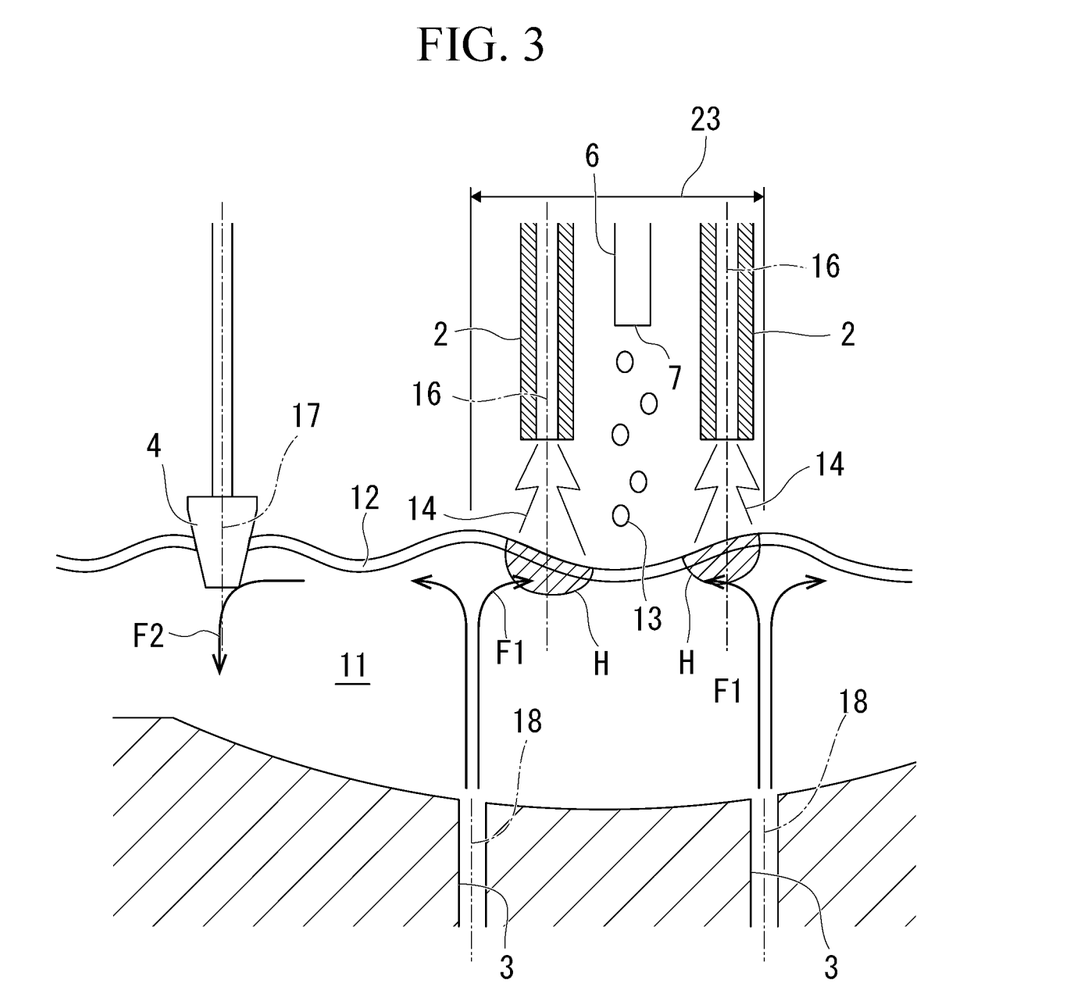
FIG. 3 is a view showing the electric furnace of FIG. 2A and a view in a direction of an arrow A-A in FIG. 2A.

An electric furnace 1 of the present embodiment has one or more upper electrodes 2, one or more bottom-blowing tuyeres 3, a mechanical stirrer 5 equipped with an impeller 4, and a charging device 6 of iron oxide-containing iron raw material. The charging device 6 of iron oxide-containing iron raw material refers to a charging device holding iron oxide-containing iron raw material on its own, or a charging device that cannot be said to hold iron oxide-containing iron raw material on its own but is linked with a container holding iron oxide-containing iron raw material through a transportation mechanism so as to be capable of supplying the iron oxide-containing iron raw material to the device. In an example shown in FIG. 1 to FIG. 3, the electric furnace has two upper electrodes 2 and three bottom-blowing tuyeres 3. Furthermore, the electric furnace has one mechanical stirrer 5 and one charging device 6. FIG. 1 to FIG. 3 show an example of the electric furnace 1 used to manufacture hot metal by supplying iron oxide-containing iron raw material 13 and melting and reducing the iron oxide-containing iron raw material. In FIG. 1, the iron oxide-containing iron raw material 13 is charged from the charging device 6. In this electric furnace 1, the upper electrode 2 form arcs 14 between the surface of molten metal 11 with the upper electrodes, gas is blown into the molten metal 11 from the bottom-blowing tuyeres 3, and the iron oxide-containing iron raw material 13 and slag 12 are mixed with the molten metal 11 while the molten metal 11 is stirred. The molten metal 11, the slag 12, and the iron oxide-containing iron raw material 13 are stirred by rotating the impeller 4 of the mechanical stirrer 5 in a state in which the bottom half of the impeller is immersed in the molten metal 11.

The electric furnace 1 shown in FIG. 1 is a direct-current electric furnace and thus has a furnace bottom electrode 10. A solid electrode may be used as the upper electrode 2. The iron oxide-containing iron raw material 13 is charged toward the surface of the molten metal 11 from a raw material injection opening 7 of the charging device 6.

As shown in FIG. 1, the mechanical stirrer 5 includes a shaft 5a extending along the vertical direction, the impeller 4 fixed to a lower end of the shaft 5a, and a driving device 5b that holds an upper portion of the shaft 5a and is rotated around the vertical axis line. The impeller 4 is a rotating body having a center 17 along the vertical direction and has, for example, four blades around the impeller. The impeller 4 has an outer shape that tapers downward and rotates to engulf the iron oxide-containing iron raw material 13 and the slag 12 floating around the impeller and sends out the iron oxide-containing iron raw material and the slag downward.

The electric furnace 1 has the above-described basic configuration, whereby the mixing of the iron oxide-containing iron raw material 13, the slag 12, and the hot metal is accelerated by the blowing of the gas from the bottom-blowing tuyeres 3. Additionally, it is possible to engulf the slag 12 and the iron oxide-containing iron raw material 13 floating on the hot metal into the hot metal (molten metal 11) by rotating the impeller 4. Therefore, it becomes possible to melt and reduce the iron oxide-containing iron raw material 13 with a high yield of iron.

The arcs 14 are formed between the upper electrodes 2 and the molten metal 11, and high-temperature regions H are formed near the arcs 14, and thus, in order to rapidly melt and reduce the iron oxide-containing iron raw material 13 charged into the electric furnace 1, it is preferable to dispose the raw material injection opening 7 of the iron oxide-containing iron raw material 13 as close to the high-temperature regions H that are near the arcs 14 as possible and keep the charged iron oxide-containing iron raw material 13 in the high-temperature regions H. In order to attain the above-described object, in a preferred aspect of the present invention, in a plan view, a shortest line segment 20 of individual line segments connecting electrode centers 16 of the respective upper electrodes 2 and a center 17 of the impeller 4 of the mechanical stirrer 5 is equally divided into three parts as shown in FIG. 2A. In addition, at a point 21a closer to the impeller 4 between two points (21) that equally divide the line segment 20 into three parts, a straight line 22 orthogonal to the line segment 20 is drawn. In addition, the centers 18 of at least three tuyeres 3 among the respective bottom-blowing tuyeres 3 are closer to the upper electrode 2 than the orthogonal straight line 22; and the electrode centers 16 of all of the upper electrodes 2 and the raw material injection opening 7 of the charging device 6 of the iron oxide-containing iron raw material toward the electric furnace 1 are present inside a polygonal shape 23 (a triangular shape in the present example) connecting the respective centers 18 of the three or more tuyeres 3 present closer to the respective upper electrodes 2 than the orthogonal straight line 22.

The disposition of the bottom-blowing tuyeres 3 is disposed so that, when the straight line 22 orthogonal to the line segment 20 is drawn at the point 21a on an impeller 4 side between the two points (21) that equally divides the line segment 20 that connects the electrode center 16 of the upper electrode 2 and the center 17 of the impeller 4 into three parts in a plan view, the centers 18 of at least three tuyeres 3 are present closer to the upper electrode 2 than the orthogonal straight line 22. As shown in FIG. 2A, when there are two or more upper electrodes 2, it is necessary to use, as a criterion, the horizontal straight line 22 that is orthogonal to the line segment 20 at the point 21a closer to the impeller 4 between the two points (21) that equally divides the shortest line segment 20 between two horizontal line segments that connect the respective electrode centers 16 and the center 17 of the impeller into three parts. In FIG. 2A, the three bottom-blowing tuyeres 3 each are disposed at shown positions in a state in which the impeller 4 and the respective upper electrodes 2 are arrayed side by side. This is not a determination banning other bottom-blowing tuyeres from being present closer to the impeller 4 than the straight line 22.

In addition, the impeller 4 and the upper electrode 2 may not be arrayed side by side. As an example, FIG. 2B shows two upper electrodes 2 being equally distant from the impeller 4. Even in this case, the positions of the three bottom-blowing tuyeres 3 are positioned closer to the upper electrodes 2 than the straight line 22 drawn at the point 21 that equally divides the line segment 20 connecting the center 17 of the impeller 4 and the electrode center 16 into three parts. In this example, the positions of the centers 18 of the tuyeres of the three bottom-blowing tuyeres 3 are equally distant from each other, but do not need to be equally distant from each other at all times.

It can be said that the position of the orthogonal straight line 22 is more preferably drawn so as to be orthogonal to the central point of the line segment 20 connecting the electrode center 16 and the center 17 of the impeller from the viewpoint of a characteristic of the present invention that melts and reduces the iron oxide-containing iron raw material 13 using the high-temperature regions H immediately below the upper electrodes 2.

In addition, in a plan view, the electrode centers 16 of all of one or more upper electrodes 2 and the raw material injection opening 7 of the charging device 6 of the iron oxide-containing iron raw material 13 toward the electric furnace 1 need to be present inside the polygonal shape 23 connecting the centers 18 of the three or more bottom-blowing tuyeres 3 present closer to the upper electrodes 2 than the orthogonal straight line 22. This is because, when the relationship among the positions of the bottom-blowing tuyeres 3, the electrode centers 16, and the raw material injection opening 7 is determined as described above, a flow of bottom-blown gas flowing from the respective bottom-blowing tuyeres 3 is formed toward a central portion of the polygonal shape 23 that connects the centers 18 of these tuyeres (refer to a reference sign F1 in FIG. 2A and FIG. 3), and the iron oxide-containing iron raw material 13 charged into the polygonal shape 23 resides near the high-temperature regions H, whereby an effect for accelerating the melting of the iron oxide-containing iron raw material 13 is expected.

Since the respective bottom-blowing tuyeres 3 are disposed so that the upper electrodes 2 and the raw material injection opening 7 of the iron oxide-containing iron raw material 13 are present in the polygonal shape 23 that connects the centers 18 of the respective bottom-blowing tuyeres 3 as described above, the horizontal shortest distance between the respective bottom-blowing tuyeres 3 is naturally determined in consideration of the arrangements in the facility. Furthermore, the horizontal shortest distance between the respective bottom-blowing tuyeres 3 may also be appropriately determined from the relationship with a side wall of the electric furnace 1. The mutual distance between the respective bottom-blowing tuyeres 3 configuring the polygonal shape 23 needs to be appropriately determined in the above-described range from the viewpoint of surrounding the iron oxide-containing iron raw material 13 charged onto the hot metal with the bottom-blown gas and preventing the iron oxide-containing iron raw material 13 from escaping from the surrounded space. From this viewpoint, it can be said that increasing the number of the bottom-blowing tuyeres 3 is effective; however, when the number of the bottom-blowing tuyeres is excessively increased, the cost increases, and, furthermore, in a case where the furnace bottom electrode 10 is provided, interference with the disposition of the furnace bottom electrode is caused, and thus the ordinary upper limit becomes approximately six.

When the electric furnace has the above-described configuration, the iron oxide-containing iron raw material 13 is added to near the high-temperature regions H immediately below the upper electrodes 2 and, simultaneously, is surrounded with the bottom-blown gas and strongly stirred with the hot metal.

In a case where the hollow upper electrodes 2 are used as shown in FIG. 1, it is possible to inject the iron oxide-containing iron raw material 13 into the electric furnace 1 through between the respective upper electrodes 2 and through internal passages of the hollow upper electrodes 2. In the electric furnace 1, the high-temperature arcs 14 are formed between the upper electrodes 2 and the molten metal 11, and thus the raw material (iron oxide-containing iron raw material 13) charged into the molten metal 11 through the internal passages of the hollow upper electrodes 2 is heated to a high temperature at the time of passing through the arcs 14 and is easily melted, which is preferable.

The iron oxide-containing iron raw material 13 charged into the electric furnace 1 has a smaller specific gravity than the hot metal (molten metal 11) and is thus melted and reduced while floating on the surface of the molten metal 11. When the iron oxide-containing iron raw material 13 is melted and reduced, iron oxide that has not been reduced turns into slag together with CaO, $SiO_2$, or the like in the raw material, this slag also has a smaller specific gravity than the hot metal (molten metal 1) and thus floats on the surface of the molten metal 11 and forms a layer of the slag 12 having the high concentration of FeO. Even when the electric furnace has the above-described preferred aspect, the slag 12 having the high concentration of FeO flows out of the above-described enclosure (polygonal shape 23) sooner or later together with the melted and reduced iron oxide-containing iron raw material 13. In this state, both the iron oxide-containing iron raw material 13 that has not been melted and reduced and FeO in the slag 12 do not sufficiently come into contact with C (reducing material) in the molten metal 11, and the reduction will not be sufficiently accelerated.

Therefore, the present invention has the mechanical stirrer 5 equipped with the impeller 4 and stirs the molten metal 11 in the furnace, the iron oxide-containing iron raw material 13 that has not been melted and reduced, and the slag 12 having the high concentration of FeO using the impeller 4. When the impeller 4 is disposed and rotated in the molten metal 11, as shown by a reference symbol F2 in FIG. 3, it is possible to engulf not only slag in which the slag formed by the melting and reduction of the iron oxide-containing iron raw material 13 charged into the electric furnace 1 and the iron oxide that is in the raw material and has not been reduced are mixed with each other but also the remaining iron oxide-containing iron raw material 13 into the molten metal. In a case where the depth of the bath is shallow as in the electric furnace 1, the efficiency of stirring by the bottom-blown gas for engulfing the slag 12 or the iron oxide-containing iron raw material 13 present on the bath surface into the bath is poor; however, when the molten metal, the iron oxide-containing iron raw material, and the slag are stirred using the impeller 4, it is possible to form a bath flow F2 that flows downward vertically by the rotation of the impeller 4, and thus the efficiency is favorable.

The impeller 4 is a refractory swirl vane, and thus, when the impeller is installed in the high-temperature region near the upper electrode 2, there is a concern that erosion may become severe. Therefore, the impeller 4 is preferably installed at a position apart from the upper electrode 2. Specifically, as described above, in the preferred aspect of the present invention, it is determined that the straight line 22 is drawn so that the impeller 4 can be installed so that, when the straight line 22 orthogonal to the line segment 20 is drawn at the point 21a on the impeller side between the two points (21) that equally divides the shortest line segment 20 of the respective line segments that connect the electrode centers 16 and the center 17 of the impeller 4 into three parts in a plan view as shown in FIG. 2A or FIG. 2B, the respective centers 18 of at least three bottom-blowing tuyeres 3 are present closer to the respective upper electrodes 2 than the orthogonal straight line 22. Therefore, the position of the impeller 4 is apart from the high-temperature regions H near the upper electrodes 2. When disposed as described above, the impeller 4 is apart from the high-temperature region H near immediately below the upper electrode 2 as shown in FIG. 3, and the bottom-blown gas is present between the high-temperature region H and the impeller 4, and thus it becomes easy to maintain the service life of the impeller 4. In addition, the impeller is capable of effectively playing a role, which is expected from the impeller 4, of engulfing the slag 12 having the high concentration of FeO or the non-melted iron oxide-containing iron raw material 13 on the bath surface which has flown from the range of the polygonal shape 23 into the bath.

When the slag having the high concentration of FeO or the like generated by the melting of the iron oxide-containing iron raw material 13 in the high-temperature regions and the hot metal are mixed and stirred together, the area of an interface in which carbon in the hot metal and iron oxide or the like in the slag 12 react with each other is increased, and the supply of heat from the hot metal is accelerated, whereby the acceleration of the reduction of the slag 12 or the like can be realized.

As described above, in the present embodiment, in the electric furnace 1 for manufacturing hot metal by supplying the iron oxide-containing iron raw material 13 from above, bottom-blowing stirring that accelerates the mixing of the slag 12, the iron oxide-containing iron raw material 13, and the hot metal using gas blown from the respective bottom-blowing tuyeres 3 and mechanical stirring that engulfs the slag 12 and the iron oxide-containing iron raw material 13 floating on the hot metal into the hot metal by the rotation of the impeller 4 are both carried out. Therefore, the melting and reduction of the iron oxide-containing iron raw material 13 are enabled with a high yield.

In the present embodiment, as the kind of the gas blown from the bottom-blowing tuyeres 3, nitrogen gas, argon gas, an oxygen-containing gas, and the like can be used. In the case of nitrogen gas and argon gas, the bottom-blowing tuyere 3 can be configured as a single-tube tuyere. In the case of blowing in an oxygen-containing gas, for example, pure oxygen, it is possible to configure the bottom-blowing tuyere as a double-tube tuyere, cause the oxygen-containing gas to flow from the inside of an internal lumen and cause gas for cooling to flow from a space between the internal lumen and an external lumen. In addition, the flow rate of the gas blown from one bottom-blowing tuyere 3 needs to be set to approximately 3 to 15 Nm$^3$/h per ton of the hot metal. This is because, when this flow rate is too low, an effect for accelerating the melting and reduction of the iron oxide-containing iron raw material 13 by bottom blowing does not clearly appear, and, on the other hand, when the flow rate is too high, not only is the effect saturated, but the operation also does not generally improve due to the deterioration of the wear rate of the bottom-blowing tuyere 3 or the frequent occurrence of slopping.

In the iron oxide-containing iron raw material 13 that is melted and reduced in the present embodiment, the iron metallization percentage is preferably 45% or more and 95% or less. The iron metallization percentage (%) refers to the mass percentage of metallic iron in the iron oxide-containing iron raw material 13 (the mass of the metallic iron/the total mass of all contained iron×100).

As described above, the present embodiment relates to the electric furnace 1 used to manufacture hot metal by heating and preliminarily reducing iron oxide-containing raw material such as iron ore, dust, or the like using a preliminary reducing furnace such as a shaft furnace or a rotary hearth furnace to produce the iron oxide-containing iron raw material 13, then, supplying the iron oxide-containing iron raw material 13 into a furnace, and melting and reducing the iron oxide-containing iron raw material in hot metal. It is preferable to use, as a preliminary reducing agent in the preliminary reducing furnace, CO gas generated at the time of reducing the raw material using carbon as a reducing agent in a direct-current arc furnace since it is possible to significantly decrease the amount of natural gas used or not to use natural gas, and it is possible to make a new process not directly relating to a process for manufacturing molten steel such as a gas generation furnace unnecessary.

When the iron metallization percentage of the iron oxide-containing iron raw material 13 manufactured by preliminary reduction is 45% or more, it is possible to use the full amount of the CO gas generated in the direct-current arc furnace as CO gas for reduction in the preliminary reducing furnace, and it is possible to prevent an increase in the electric power consumption rate by suppressing an increase in the carbon material consumption rate and suppressing an increase in necessary reduction heat in the direct-current arc furnace without causing a decrease in the entire reduction efficiency. In the case of carrying out reduction mainly using CO gas in a preliminary reducing furnace such as a shall furnace without using natural gas, it is difficult to manufacture reduced iron having an upper limit of the reduction rate being more than 95%, and thus it is preferable to set the upper limit of the iron metallization percentage of the iron oxide-containing iron raw material 13 to 95%.

Iron oxide in the iron oxide-containing iron raw material 13 is reduced using carbon contained in the hot metal of the seed bath as a reducing agent. As a result, the concentration of carbon in the hot metal of the hot heel decreases, and thus it is necessary to supply a carbon source. The iron oxide-containing iron raw material 13 may contain a carbon-containing substance as a reducing agent contributing to reduction in the arc furnace. In addition, an additional carbon source may be supplied by charging a carbon-containing substance into the direct current arc furnace separately from the iron oxide-containing iron raw material 13.

The iron oxide-containing iron raw material 13 preferably contains a total of 4% to 24% by mass of an oxide other than iron oxide. As the oxide, specifically, CaO, SiO$_2$, Al$_2$O$_3$, and MgO are exemplified. These oxides are slag components. The slag component in the raw material does not melt due to slag being caused to float on the surface of the hot metal by the progress of melting and trapping the raw material charged from the top of the furnace, thereby hindering the contact between the raw material and the hot metal, and a decrease in the yield of iron is caused. Therefore, the upper limit of the slag component in the raw material is set to 24% by mass. The iron oxide-containing iron raw material 13 is used in a sintered iron or pellet form in order to heat and preliminarily reduce the iron oxide-containing iron raw material such as iron ore or dust using the preliminary reducing furnace. In order for that, generally, at least 4% by mass of the above-described oxide is added to the raw material, and thus the lower limit of the slag component in the raw material is set to 4% by mass.

a rotary hearth furnace was used. The composition of the iron oxide-containing iron raw material 13 was as shown in Table 1. The iron metallization percentage was 65.6%, and the content of an oxide other than iron oxide was 17.8% by mass.

TABLE 1

| Component composition (% by mass) | | | | | | | | | | | | Metallization percentage |
|---|---|---|---|---|---|---|---|---|---|---|---|---|
| (T. Fe) | M. Fe | FeO | $Fe_2O_3$ | CaO | $SiO_2$ | $Al_2O_3$ | MgO | C | S | $Cr_2O_3$ | Total | % |
| 73.0 | 47.9 | 22.3 | 11.1 | 5.8 | 6.8 | 3.3 | 1.6 | 0.6 | 0.3 | 0.3 | 100.0 | 65.6 |

Examples

Hereinafter, examples according to the present invention will be described together with comparative examples.

As the electric furnace 1, a direct-current electric furnace shown in FIG. 1, FIG. 2A, and FIG. 3 was used. This electric furnace 1 had a furnace inner radius of 4 m in a plan view and was capable of storing 100 tons of hot metal as the molten metal 11 and thus had a hollow structure having an outer diameter of 800 mm and an inner diameter of 200 mm. Two upper electrodes 2 were disposed at positions shown in FIG. 1 and FIG. 2A at an interval of 2 m.

Three bottom-blowing tuyeres 3 each were a single-tube tuyere and had an inner diameter of 15 mm, and $N_2$ gas was blown in from the respective tuyeres at the flow rate of 110 $Nm^3/h$. The raw material injection opening 7 of the charging device 6 was present at a position near the center 9 of the polygonal shape 23 connecting the centers 18 of the tuyeres. Furthermore, the impeller 4 of the mechanical stirrer 5 was disposed at a position shown in FIG. 1 and FIG. 2A. The mechanical stirrer 5 had the impeller 4 produced using an alumina castable as a refractory material. The impeller 4 had four stirring blades, the diameter of the stirring blade was 1.0 m, and the height of the stirring blade was 0.3 m. This impeller 4 was installed so that the center 17 of the impeller 4 was positioned 2.2 meters apart from the center of the electric furnace 1 (furnace inner radius: 4 m) in a state in which the impeller was immersed in the hot metal so that the height from the bottom of the furnace to the bottom surface of the impeller 4 reached 50 mm.

The impeller 4 was installed so that, when the straight line 22 orthogonal to the line segment 20 was drawn at the point 21a on the impeller 4 side between the two points (21) that equally divided the shortest line segment 20 of the respective line segments that connected the respective electrode centers 16 and the center 17 of the impeller into three parts in a plan view, the centers 18 of at least three tuyeres were present closer to the upper electrodes 2 than the orthogonal straight line 22. Therefore, it was possible to carry out stirring so that the slag 12 and the non-melted iron oxide-containing iron raw material 13 floating on the hot metal were engulfed into the hot metal at a position apart from high-temperature regions near the upper electrodes 2.

The iron oxide-containing iron raw material 13 was charged into the furnace in which hot heel was present, melted, and reduced using the electric furnace 1 described above.

As the iron oxide-containing iron raw material 13, iron oxide-containing iron raw material preliminarily reduced in In the electric furnace 1, hot metal of the hot heel (50 tons) having an average temperature of 1450° C. to 1500° C. and the concentration of C being 3.5% by mass to 4.0% by mass had been charged, the iron oxide-containing iron raw material 13 having a particle diameter of 1 mm to 50 mm was continuously supplied by being dropped by gravity for 20 minutes (equivalent to 50 tons of the hot metal) from the raw material injection opening 7 positioned between two upper electrodes 2 to the high-temperature regions in the furnace at the flow rate of 2.5 t/min in terms of the amount of the hot metal and then melted and reduced for 40 minutes. Carbon in the hot metal of the hot heel was consumed as the reduction progressed, the concentration of carbon decreased, and thus soil graphite was gradually charged into the furnace from hollow tubes of the upper electrodes 2 as a carbon-containing substance in order to replenish carbon as much as consumed. After 60 minutes from the initiation of the supply of the iron oxide-containing iron raw material 13, the hot metal (50 tons) was poured into a pan, and, repeatedly, the above-described operation was carried out, thereby carrying out the melting and reduction of the iron oxide-containing iron raw material 13. During the melting and reduction operation, slag sampling was carried out every five minutes, and the concentration of FeO in the slag was evaluated.

For comparison, as examples with different stirring conditions, (i) an operation result under a condition in which mechanical stirring was not carried out, (ii) an operation result under a condition in which bottom blowing was not carried out, and (iii) an operation result in the present invention in which both mechanical stirring and bottom blowing were carried out will be collectively described. In order to describe an effect according to the present invention, a status of a change in the concentration of FeO in the slag over time during the melting and reduction was employed as an index of the yield of iron. The results are shown in FIG. 4, FIG. 5, and FIG. 6.

Figure 4:
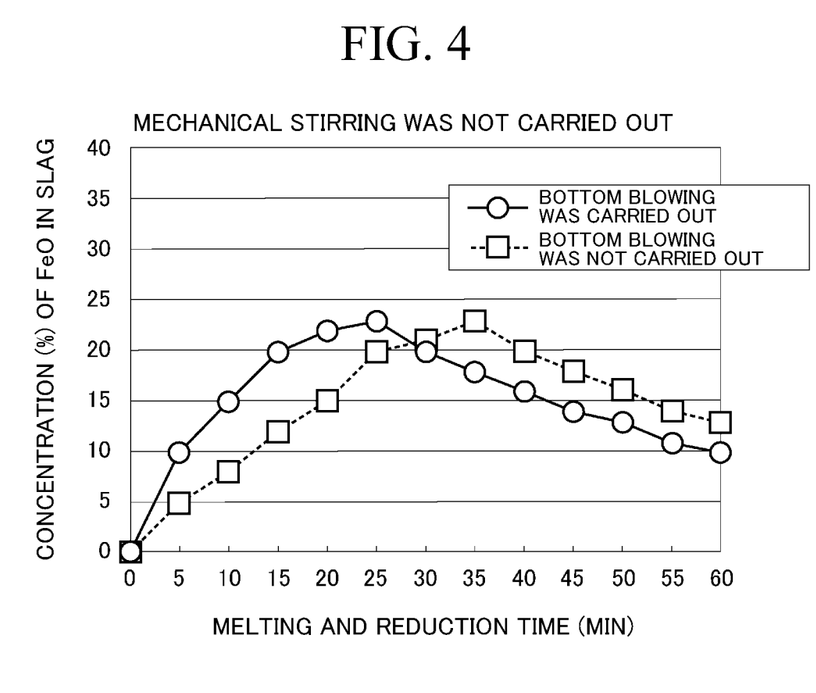
FIG. 4 is a graph showing an influence of the presence or absence of bottom blowing on the concentration of FeO in slag during a melting and reduction treatment in an operation in which mechanical stirring is not carried out.

In the case of (i) (comparative example: mechanical stirring was not carried out), as shown in FIG. 4, in a case where bottom blowing was carried out, the increasing rate of the concentration of FeO in the slag by the melting of the iron oxide-containing iron raw material 13 was faster than that in a case where bottom blowing was not carried out. However, the reduction rate of the slag after the melting of the iron oxide-containing iron raw material 13 did not differ significantly under both conditions. Based on this fact, in this example, the melting of the iron oxide-containing iron raw material 13 could be rapidly progressed by charging the iron oxide-containing iron raw material 13 into the high-temperature regions immediately below the upper electrodes 2 and imparting bottom blowing at those positions. In addition, regarding the reduction of the molten FeO generated in association with the melting, the maximum concentration did not change regardless of the fact that the melting was rapid, and thus it can be said that there was also a reduction-accelerating effect. As a comprehensive effect, the melting could be rapidly ended, and thus the following reduction time became long, and, finally, at a point in time when 60 minutes had passed from the initiation of the melting and reduction operation, there was an effect for relatively decreasing the concentration of FeO in the slag.

Figure 5:
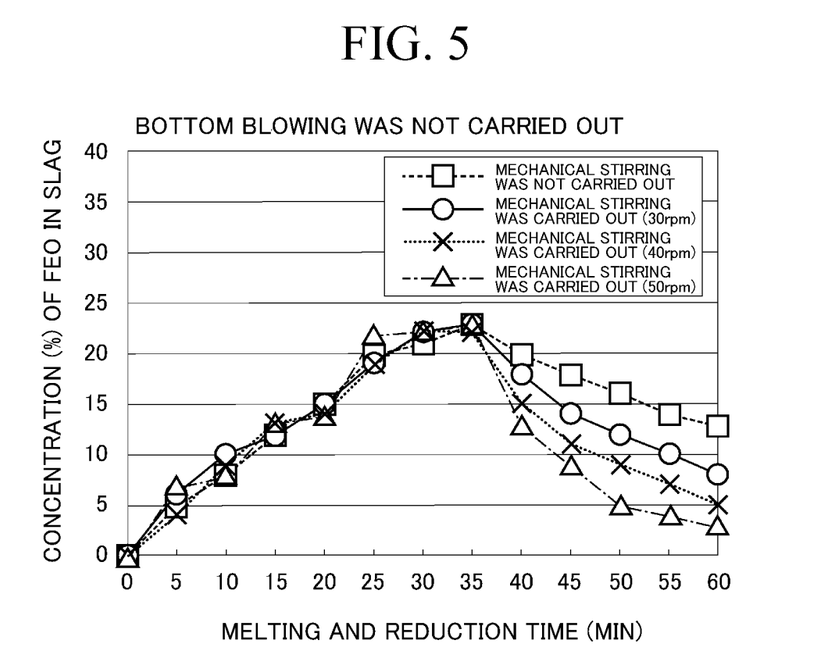
FIG. 5 is a graph showing an influence of the mechanical stirring on the concentration of FeO in the slag during the melting and reduction treatment in an operation in which bottom blowing is not carried out.

In the case of (ii) (comparative example: bottom blowing was not carried out), as shown in FIG. 5, even in a case where mechanical stirring was carried out, the increasing rate of the concentration of FeO in the slag by the melting of the iron oxide-containing iron raw material 13 did not significantly differ from that in a case where the mechanical stirrer 5 was not carried out at any rotational speed. However, the reduction rate of the slag after the melting of the iron oxide-containing iron raw material 13 increased as the rotational speed increased, and both the reduction rate and the rotational speed were faster than those in a case where stirring was not carried out. Based on this fact, in this example, whether or not rotation was carried out by the mechanical stirrer 5 did not make any changes in the melting rate of the iron oxide-containing iron raw material 13 since the engulfing of the slag 12 and the iron oxide-containing iron raw material 13 into the hot metal by the rotation did not reach the high-temperature regions immediately below the upper electrodes 2. However, the reduction of the slag including FeO generated in association with the melting could be rapidly progressed even at positions apart from the high-temperature regions, and, finally, at a point in time when 60 minutes had passed, there was an effect for decreasing the concentration of FeO in the slag in accordance with the degree of engulfing by rotation.

Figure 6:
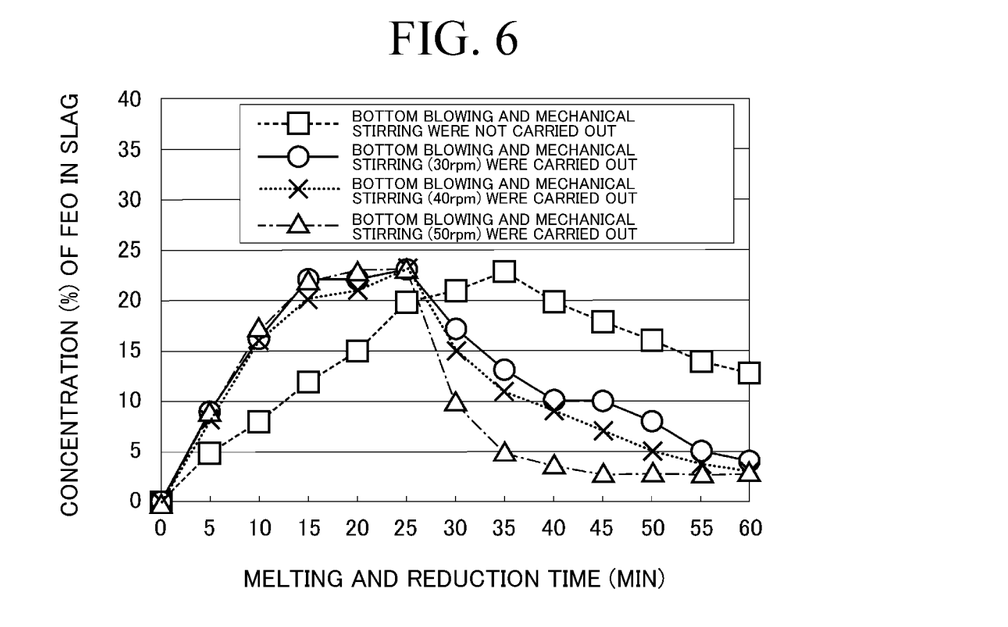
FIG. 6 is a graph showing an influence of both bottom blowing and mechanical stirring on the concentration of FeO in the slag during the melting and reduction treatment in an operation according to the present invention.

In the case of (iii) (invention example: both mechanical stirring and bottom blowing were carried out), as shown in FIG. 6, the increasing rate of the concentration of FeO in the slag 12 by the melting of the iron oxide-containing iron raw material 13 was increased by carrying out bottom blowing, and the reduction rate of the slag 12 increased as the rotational speed of the impeller 4 increased. When compared with cases where neither bottom blowing nor mechanical stirring were carried out (□ in the figure), it is found that both the increasing rage of the concentration of FeO in slag and the reduction rate were faster.

When the results of the cases of (i) and (ii) are also collectively considered, bottom blowing in the invention example exhibited an effect for keeping the iron oxide-containing iron raw material 13 floating on the surface of the hot metal in the high-temperature molten metal surfaces immediately below the upper electrodes 2 by stirring and stirring the iron oxide-containing iron raw material together with the hot metal, thereby rapidly melting the iron oxide-containing iron raw material 13. At this time, the reduction of FeO generated by the melting was also progressed, and the maximum concentration of FeO was equal to those in the cases of (i) and (ii) regardless of the fact that the iron oxide-containing iron raw material was rapidly melted. The time taken for the concentration of FeO to reach the maximum was almost equal to that in the case of (i), and thus it can be said that whether or not bottom blowing was carried out during that time rarely made a change between both cases.

Mechanical stirring in the invention example engulfed the slag 12 including FeO derived from the iron oxide-containing iron raw material that was rapidly melted by bottom blowing and the non-melted iron oxide-containing iron raw material 13 into the hot metal and exhibited an effect for accelerating the contact with carbon in the hot metal and the supply of heat that the hot metal had to the same extent as in the case of (ii). The decreasing rate of the concentration of FeO from a point in time when the concentration of FeO reached the maximum was almost equal to that in the case of (ii), and thus it can be said that whether or not bottom blowing was carried out during that time rarely made a change between both cases.

However, as an effect of the joint use of bottom blowing and mechanical stirring, it can be said that the melting of the iron oxide-containing iron raw material 13 was fast and, additionally, there was an effect for decreasing the reached concentration of FeO in a 60-minute evaluation since the maximum concentration of FeO was equal to that in a case where bottom blowing was not carried out and a certain period of time was required for melting, and the reduction rate of FeO from the maximum value of such the concentration of FeO was fast. In addition, in an example in which bottom blowing was carried out and the rotational speed of the impeller 4 was set to 50 rpm, the concentration of FeO decreased to 5% or less in 35 minutes, and thus this can also be evaluated as an efficiency-improving effect.

It can be said that, in a hot metal-manufacturing operation in which an ordinary direct-current arc furnace and iron oxide-containing iron raw material are used, it is an operation having an extremely high yield of iron to achieve 10% or less of the concentration of FeO in the slag after 40 minutes from the initiation of the supply of the raw material.

INDUSTRIAL APPLICABILITY

According to the present invention, it is possible to provide an electric furnace enabling the melting and reducing of iron oxide-containing iron raw material with a high yield of iron and a method for melting and reducing iron oxide-containing iron raw material using the electric furnace. Therefore, the present invention is highly industrially applicable.

BRIEF DESCRIPTION OF THE REFERENCE SYMBOLS

1 ELECTRIC FURNACE
2 UPPER ELECTRODE
3 BOTTOM-BLOWING TUYERE
4 IMPELLER
5 MECHANICAL STIRRER
6 CHARGING DEVICE
7 RAW MATERIAL INJECTION OPENING
10 FURNACE BOTTOM ELECTRODE
11 MOLTEN METAL
12 SLAG
13 IRON OXIDE-CONTAINING IRON RAW MATERIAL
14 ARC
15 INNER CIRCUMFERENCE
16 ELECTRODE CENTER (CENTER OF UPPER ELECTRODE)
17 CENTER OF IMPELLER
18 CENTER OF TUYERE
20 LINE SEGMENT
21 POINT
22 STRAIGHT LINE
23 POLYGONAL SHAPE

The invention claimed is:

1. An electric furnace comprising:
a plurality of upper electrodes;
three or more bottom-blowing tuyeres;
a mechanical stirrer equipped with an impeller; and
a charging device which injects an iron oxide-containing iron raw material,
wherein the three or more bottom-blowing tuyere are disposed such that, when a straight line orthogonal to a shortest line segment among line segments connecting each of centers of the plurality of upper electrodes and a center of the impeller, respectively, is drawn at a point closer to the impeller between two points that equally divide the shortest line segment into three parts in a plan view,
centers of at least three bottom-blowing tuyeres among the three or more bottom-blowing tuyeres are present closer to the plurality of upper electrodes than the orthogonal straight line.

2. The electric furnace according to claim 1,
wherein, in the plan view, centers of all of the respective plurality of upper electrodes and a raw material injection opening of the charging device is present inside a polygonal shape connecting the respective centers of the three or more bottom-blowing tuyeres present closer to the respective plurality of upper electrodes than the orthogonal straight line.

3. A method for melting and reducing an iron oxide-containing iron raw material performed in the electric furnace according to claim 1, the method comprising:
when the iron oxide-containing iron raw material having an iron metallization percentage of 45% or more and 95% or less is charged from the charging device and melted and reduced in the electric furnace in which molten metal is present, immersing and rotating the impeller of the mechanical stirrer in the molten metal, thereby stirring slag present on a surface of the molten metal and the molten metal.

4. A method for melting and reducing an iron oxide-containing iron raw material performed in the electric furnace according to claim 2, the method comprising:
when the iron oxide-containing iron raw material having an iron metallization percentage of 45% or more and 95% or less is charged from the charging device and melted and reduced in the electric furnace in which molten metal is present, immersing and rotating the impeller of the mechanical stirrer in the molten metal, thereby stirring slag present on a surface of the molten metal and the molten metal.

* * * * *